(12) United States Patent
Durden et al.

(10) Patent No.: US 6,442,756 B1
(45) Date of Patent: *Aug. 27, 2002

(54) SYSTEM AND METHOD FOR TRANSPORTING, PROCESSING, STORING AND DISPLAYING EIT AND EPG INFORMATION IN A TELEVISION SYSTEM CONTEXT

(75) Inventors: George A. Durden; Paul T. Watson, both of Alpharetta; Thomas E. Murphy, Atlanta; Harvey L. Chatham, Suwanee; William C. Versteeg, Alpharetta, all of GA (US)

(73) Assignee: BellSouth Intellectual Property Corporation, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,054

(22) Filed: Oct. 13, 1999

Related U.S. Application Data

(60) Provisional application No. 60/104,110, filed on Oct. 13, 1998.

(51) Int. Cl.$^7$ .......................... H04N 7/00; H04N 5/445; G06F 3/00
(52) U.S. Cl. .......................... 725/50; 725/40; 725/142; 725/90; 348/906
(58) Field of Search ...................... 725/37–61; 348/906

(56) References Cited

U.S. PATENT DOCUMENTS

| | | | | |
|---|---|---|---|---|
| 5,657,072 A | * | 8/1997 | Aristides et al. | 348/13 |
| 5,844,620 A | * | 12/1998 | Coleman et al. | 348/461 |
| 5,917,481 A | * | 6/1999 | Rzeszewski et al. | 725/50 |
| 5,990,890 A | * | 11/1999 | Etheredge | 345/808 |
| 6,005,561 A | * | 12/1999 | Hawkins et al. | 725/105 |
| 6,115,080 A | * | 9/2000 | Reitmeier | 348/731 |
| 6,173,330 B1 | * | 1/2001 | Guo et al. | 709/232 |
| 2002/0026349 A1 | * | 2/2002 | Reilly et al. | 705/14 |

OTHER PUBLICATIONS (Neufeldt, Webster's New World Dictionary, Simon & Schuster, Third College Edition, p. 1335).*

* cited by examiner

*Primary Examiner*—Andrew Faile
*Assistant Examiner*—Reuben Brown
(74) *Attorney, Agent, or Firm*—Shaw Pittman LLP

(57) ABSTRACT

An electronic program guide executing in a set top box provides real-time guide EIT information to users for periods beyond the six hours of conventional systems. Each transport providing information to the set top box contains a predetermined number of hours of full EIT data and a predetermined number of days of sparse EIT data. The sparse EIT data allows users to see information for programming in real time days into the future without having to tune to a different transport.

77 Claims, 3 Drawing Sheets

SYSTEM AND METHOD FOR TRANSPORTING, PROCESSING, STORING AND DISPLAYING EIT AND EPG INFORMATION IN A TELEVISION SYSTEM CONTEXT

This application claims the benefit of U.S. Provisional Application No. 60/104,110 Oct. 13, 1998.

This invention relates to systems and methods for transporting, processing, storing and displaying data and information such as that associated with electronic programming guides and Electronic Programming Guide (EPG) information and Event Information Table (EIT) information in a television system context.

BACKGROUND OF THE INVENTION

Advances in technology continue to create a wide variety of services and programs offered to users via television and other video equipment. Such content may be disseminated via various media including cable, satellite, broadcast, and terrestrial systems such as LMDS and MMDS. Such content may include (1) traditional broadcast and cable television programs, (2) video services, such as pay-per-view (PPV), near video-on-demand, promo channels, electronic programming guides, and localized or specially formatted information, (3) cable delivered pc-based content and services, and (4) interactive services.

A variety of devices may be used to interface to service a content delivery media, such as, for example, a set top box (STB) connected to a user's TV set. For purposes of this document, the term STB is used to refer to any and all such interface devices. Typically, today's STB capabilities include receiving signals from the media, providing content in a number of channels and causing the subscribers' TV set to display the selected channel.

Today, users can view programming or service information (SI) for near term services and program contents. However, a user may wish to determine which programs or contents are available for a future period, for example, a summary for seven days in the future. At this time, SI contains only a limited amount of information regarding future programming.

Currently, a user scrolls, for example, an electronic programming guide (EPG) for a display of available programming. The STB has to tune away from the current program, access requested data, obtain the requested information and display that information on the user's TV set. A user may wait anywhere from 3–20 seconds during this process. To return to the user's originally viewed channel, the STB reverses these steps while the user waits to return to the original program.

It would be advantageous to provide users with event information conveniently in real time for a longer period such as, up to one week in the future. Conventional arrangements do not provide this capability. For large or multiple networks, the event information table (EIT) and SI information constitutes an amount of data so great that the STB cannot store all the data effectively for multiple days, for all networks and transports, compressed or uncompressed. Further, the latency caused by breaking large files into smaller files with some duplicate data is not effective.

Consequently, a need exists for systems and methods for efficiently providing information such as EIT and EPG information corresponding to longer periods of time.

DETAILED DESCRIPTION OF THE DRAWINGS

Figure 1:
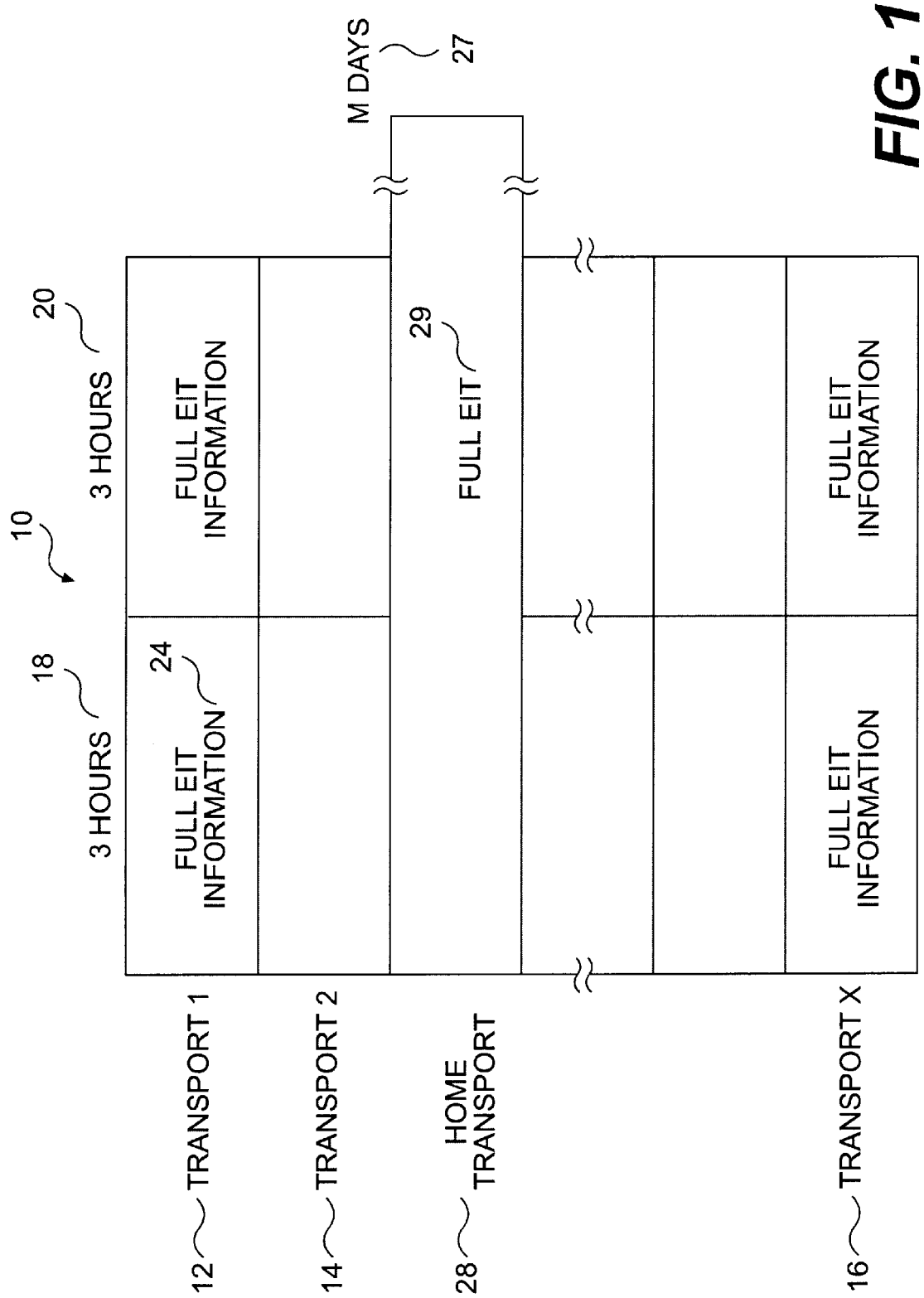
FIG. 1 shows one arrangement for providing EIT and EPG information to a terminal.

FIG. 1 shows one method 10 for providing event information to a user. Each transport 12, 14, 16 carries two three-hour segment events 18, 20 and 22. In a three hour segment, the full EIT information 24 for that period is available. Typically, in MMDS, a transport comprises one of thirty-one six MHz channels. Each channel can have the capacity for 27 Mbits of data. Thus, in a transport between 6–12 video programs (more for others such as audio, still frame, and web page information) can be viewed from a programming guide.

In the method of FIG. 1, a STB can only store two three-hour segments at a time for a total of six hours of program information available to a user. Standards for providing EIT AND EPG information are disclosed in EN 300 468 v1.3.1. (1997–09) of the European Standard Telecommunications series document.

Operationally, if a user wants to view a selection of available programs, he scrolls an electronic programming guide. If the desired information is not in the STB, the STB tunes away to the home transport 28 (also referred to as the home channel). The home transport 28 contains full EIT 29 information across the entire M period for all programs. In the present environment, a user can only select from programming information up to six hours in the future without tuning to the home channel. This is due to memory limitations in the STB. The STB must then select the correct transport, retrieve it and display the event information on the user's TV. To return back to the user's prior viewing channel, the STB reverses the prior process. The STB selects the original transport, retrieves it and displays it on the user's TV. A time delay of between 3–20 seconds occurs while the user waits to received the selected information.

Figure 2:
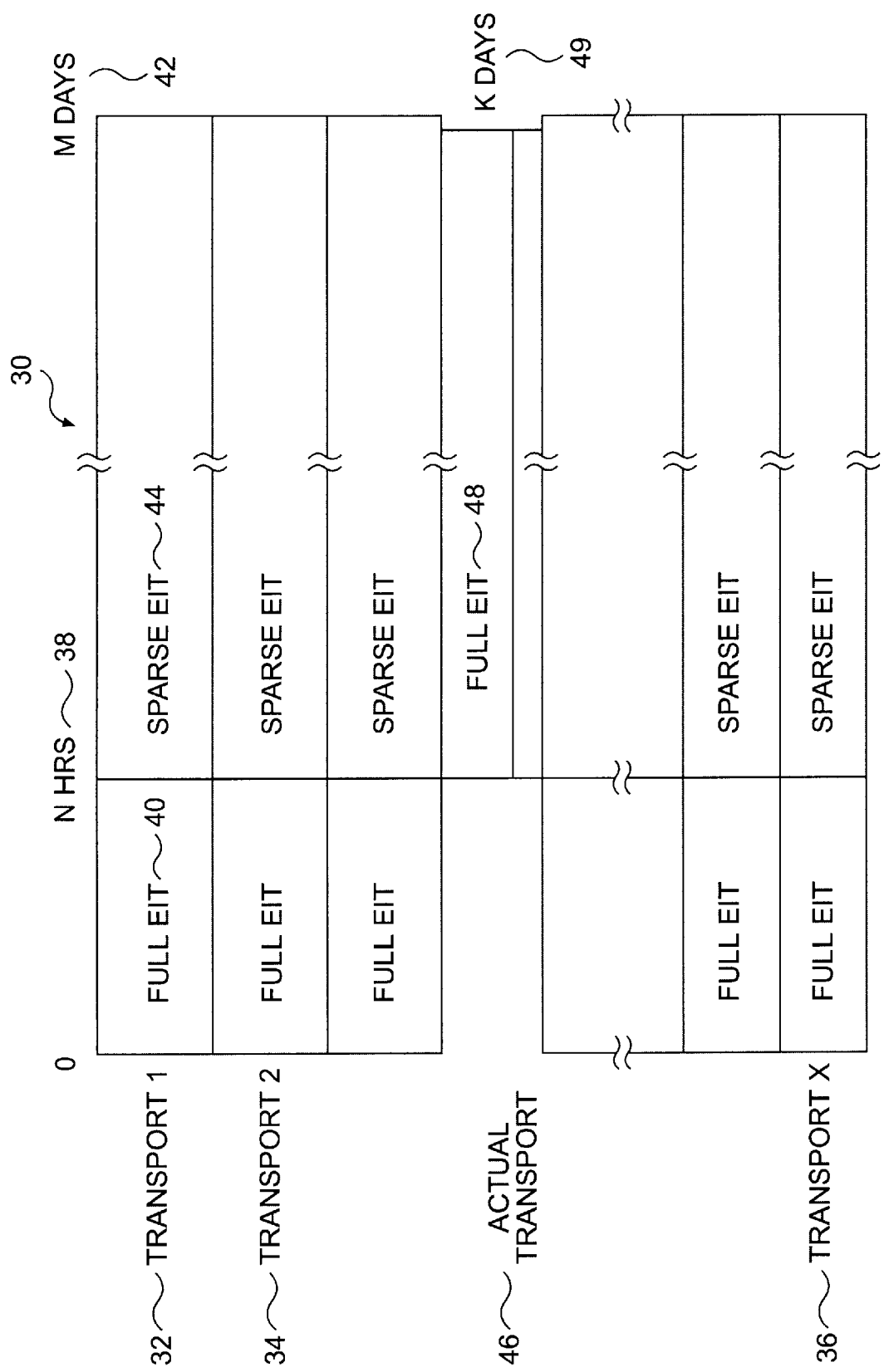
FIG. 2 shows a paradigm of transporting, receiving, storing and displaying information according to an embodiment of the present invention.

FIG. 2 shows a paradigm 30 of a preferred embodiment of the present invention. A user may view event information using the present invention up to M days in the future.

A user scrolls through an electronic programming source to find a desired program. A plurality of transports (32, 34, and 36) contains from 0 to N hours 38 of full set of EIT data 40 for all transports. A full EIT provides information regarding the events contained within each service. Such information includes for example, the name of the event, start time, duration of event, running status, and descriptors. Descriptors may include the kind of program, such as sports or entertainment, name of director and actors, and program rating.

From N hours 38 to M days 42, each transport contains sparse EIT data 44. Sparse EIT data is a subset of the full EIT data. A sparse EIT 44 contains for example, the name of event, start time, duration and event rating. Thus a single transport contains the full EIT 40 for N hours 38 and sparse BIT 44 for up to M days.

An actual transport 46 carries the full EIT 48 for its transport from N hours 38 to K days 49. Actual transport represents the currently tuned transport.

Content providers may utilize a variety of mediums to transmit event information to the STB under the present invention including MMDS, LMDS, satellite, DVB, wireless and wireline cable and digital transmission systems.

Figure 3:
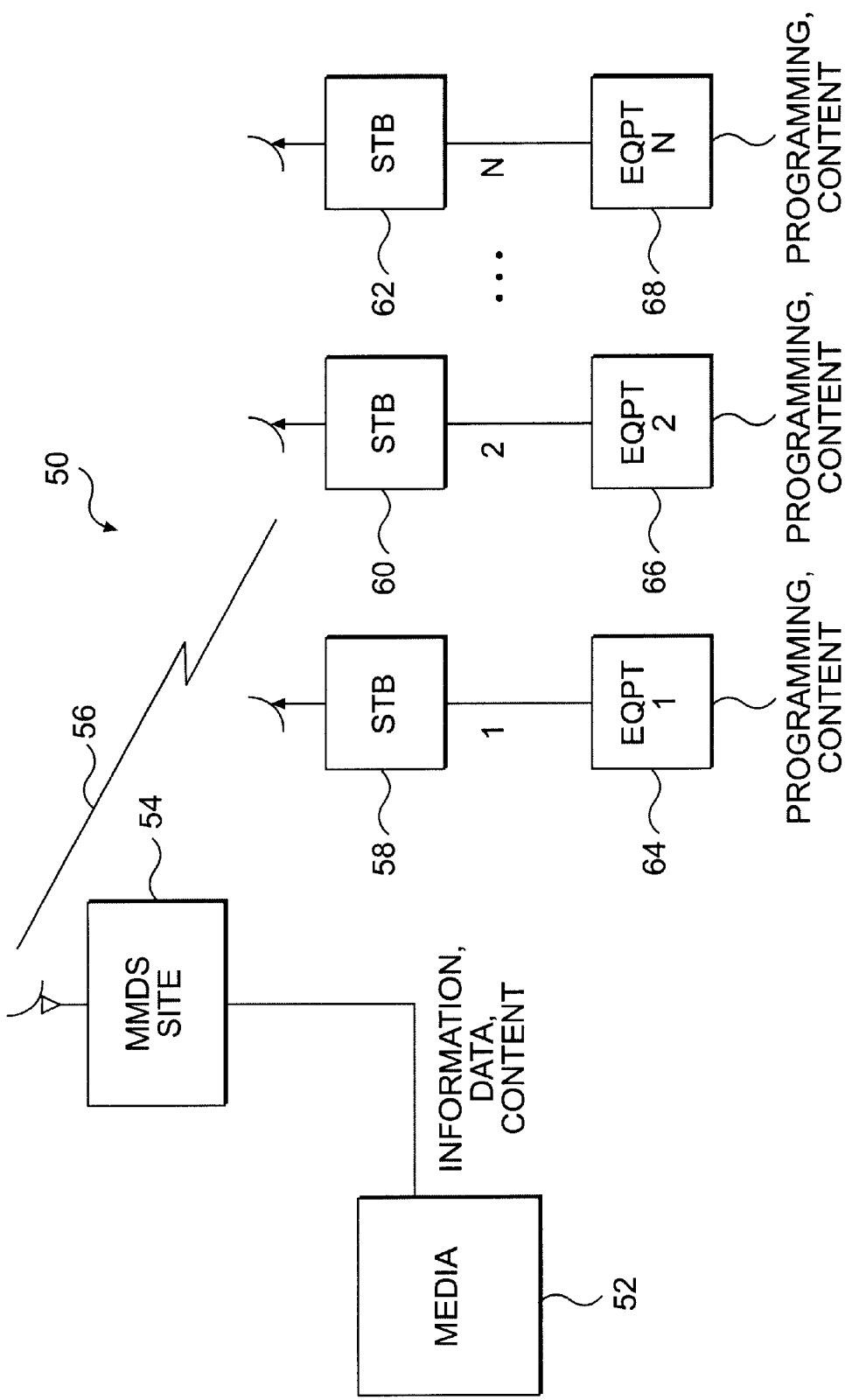
FIG. 3 shows a MMDS system and support processes of the present invention and forming the present invention.

A conventional MMDS 50 of the sort shown in FIG. 3 has support processes of the present invention and form the present invention. A content provider provides media 52 such as information, data and content to the MMDS site 54. A RF link 56 transports that information, data and content to a plurality of STBs 58, 60 and 62. Each STB 58, 60 and 62 is operatively connected to equipment 64, 66 and 68 at a user location. Equipment 64, 66 and 68 may include a TV set or displaying device. Programming and/or content is available for viewing by a user from the equipment 64, 66 and 68.

Operationally, a user scrolls a program guide to find out information about future programming, for example 3 days away. The STB stores in memory the sparse EIT M days in the future for the requested programming information. If full information is needed, the STB tunes into that transport, obtains that information to display that information on the users TV. When the user has completed reviewing the selected information, the STB knows from memory where the transport is located that the user was originally tuned to (i.e. the actual transport) and returns to that transport.

This method and system is advantageous because it better utilizes memory in the STB while minimizing data transmission requirements of the system. The bandwidth that is saved by this invention and can be used to provide additional services to the subscriber.

Another advantage of the present invention is that all transports are used in a manner that provides coverage for all seven days of EIT and EPG information without requiring additional memory in the STB.

While certain embodiments of the present invention have been described above, these descriptions are given for purpose of illustration and explanation. Variations, changes, modifications and departures from the systems and methods disclosed above may be adopted without departure from the scope or spirit of the present invention.

What is claimed is:

1. A system for providing video services, comprising:
   a set top box to receive electronic program guide information and to provide electronic program guide information to a user in response to a user request for the electronic program guide information; and
   a plurality of transports each containing a predetermined number of hours of full EIT data and a predetermined number of days of sparse EIT data, the sparse EIT data comprising some, but not all, of full EIT data, wherein said set top box receives the electronic program guide information from the plurality of transports and responds to the user request for the electronic program guide information using the full and sparse EIT data without combining the sparse EIT data to create full EIT data.

2. The system recited in claim 1, where in the predetermined number of days is greater than 2.

3. The system recited in claim 1, wherein the full and sparse EIT data is stored in a memory in the set top box.

4. The system recited in claim 1, further comprising a TV on which the electronic program guide information is displayed in response to the user request.

5. The system recited in claim 1, further comprising a content provider to provide the plurality of transports.

6. The system recited in claim 1, wherein the set top box tunes away to a home transport to obtain full EIT data the user request seeks if the requested full EIT is not present in a current transport.

7. The system recited in claim 1, wherein the sparse EIT data further comprises data relating to channels in transports other than the current transport to which the set top box is tuned.

8. A method for providing video services, comprising the steps of:
   receiving electronic program guide information from a plurality of transports, each transport each containing a predetermined number of hours of full EIT data and a predetermined number of days of sparse EIT data, the sparse EIT data comprising some, but not all, of full EIT data; and
   providing the electronic program guide information to a user in response to a user request for the electronic guide information without combining the sparse EIT data to create full EIT data.

9. The method recited in claim 8, where in the predetermined number of days is greater than 2.

10. The method recited in claim 8, further comprising the step of storing the full and sparse EIT data in a memory of a set top box.

11. The method recited in claim 8, further comprising the step of displaying the electronic program guide information a TV in response to the user request.

12. The method recited in claim 8, further comprising the steps of:
   tuning to a home transport to obtain full EIT data the user request seeks if the requested full EIT data is not present in a current transport;
   and providing the obtained full EIT data to the user in response to the user request.

13. A set top box for obtaining and providing program guide information, comprising:
   means for receiving the electronic program guide information from a plurality of transports, each transport containing a pre-determined number of hours of full EIT data and a pre-determined number of days of sparse EIT data, the sparse EIT data comprising some, but not all, of full EIT data;
   means for storing the electronic program guide information; and
   means for providing a portion of the program guide information to a user in response to a user request without combining the sparse EIT data to create full EIT data.

14. The set top box recited in claim 13, wherein the pre-determined number of days is greater than 2.

15. The set top box recited in claim 13, further comprising means for tuning to a home transport to obtain full EIT data requested by the user that is not stored in the set top box.

16. The set top box recited in claim 13, further comprising means for obtaining the electronic program guide information during periods when the user is not likely to make requests for electronic program information.

17. The set top box recited in claim 13, further comprising means for sending the portion of the electronic program guide information to a display device for display to the user.

18. A method for providing electronic program guide information to a user in response to a user request for the electronic program guide information, comprising the steps of:
   receiving a plurality of transports, each transport containing a pre-determined number of hours of full EIT data and a pre-determined number of days of sparse EIT data, the sparse EIT data comprising some, but not all, of full EIT data;
   receiving the user request for the electronic program guide information;
   obtaining a portion of the electronic program guide information corresponding to the user request from the EIT data; and sending the portion of the electronic program guide information to the user without combining the sparse EIT data to create full EIT data.

19. The method recited in claim 18, further comprising the step of storing the EIT data.

20. The method recited in claim 18, wherein the predetermined number of days is greater than 2.

21. The method recited in claim 18, further comprising the step of tuning to a particular transport to obtain the electronic program guide information.

22. The method recited in claim 21, further comprising the step of tuning to a second transport to obtain full EIT data corresponding to the user request that is not contained in the particular transport.

23. The method recited in claim 18, further comprising the step of displaying the electronic program guide information corresponding to the user request on a display device.

24. The method recited in claim 23, further comprising the step of displaying the electronic program guide information corresponding to the user request on a TV.

25. A computer program product comprising a computer usable medium having computer program logic recorded thereon for enabling a processor in a computer system to obtain and provide program guide information, the computer program logic comprising:

means for receiving the electronic program guide information from a plurality of transports, each transport containing a pre-determined number of hours of full EIT data and a pre-determined number of days of sparse EIT data, the sparse EIT data comprising some, but not all, of full EIT data;

means for storing the electronic program guide information; and means for providing a portion of the program guide information to a user in response to a user request without combining the sparse EIT data to create full EIT data.

26. The computer program product recited in claim 25, wherein the predetermined number of days is greater than 2.

27. The computer program product recited in claim 25, further comprising means for tuning to a home transport to obtain full EIT data requested by the user that is not stored in the set top box.

28. The computer program product recited in claim 25, further comprising means for obtaining the electronic program guide information during periods when the user is not likely to make requests for electronic program information.

29. The computer program product recited in claim 25, further comprising means for sending the portion of the electronic program guide information to a display device for display to the user.

30. A system for providing video services, comprising:

a set top box to receive electronic program guide information, and to provide the electronic program guide information to a user in response to a user request for the electronic program guide information;

an actual transport to which the set top box is currently tuned, the actual transport comprising a first predetermined number of days of full EIT data;

one or more additional transports, each additional transport comprising a second predetermined number of hours of full EIT data and a third predetermined number of days of sparse EIT data, wherein the sparse EIT data comprises some, but not all, of full EIT data corresponding to a future time frame; and wherein the set top box receives the full and sparse EIT data from the actual transport and the additional transports, and responds to the user request for the electronic program guide information using the full and sparse EIT data without combining the sparse EIT data to create the full EIT data.

31. The system recited in claim 30, wherein the set top box comprises a memory for storing the full EIT data as it is received from the actual and additional transports and for storing the sparse EIT data as it is received from the additional transports.

32. The system recited in claim 30 wherein the third predetermined number of days of sparse EIT data is greater than two.

33. The system recited in claim 30, further comprising a television on which the electronic program guide information is displayed in response to the user request.

34. The system recited in claim 30, further comprising a content provider to provide content for the actual transport and additional transports.

35. The system recited in claim 30, wherein the set top box tunes away from the actual transport to one of the additional transports to obtain full EIT data for a future time frame that is not contained in the actual transport.

36. A method for providing video services, comprising the steps of:

receiving electronic program guide information from an actual transport comprising a first predetermined number of days of full EIT data and one or more additional transports, each additional transport comprising a second predetermined number of hours of full EIT data and a third predetermined number of days of sparse EIT data, wherein the sparse EIT data comprises some, but not all, of full EIT data corresponding to a future time frame; and providing the electronic program guide information to a user in response to a user request for the electronic program guide information without combining the sparse EIT data to create full EIT data.

37. The method recited in claim 36, further comprising the step of storing the full EIT data as it is received from the actual and additional transports and the sparse EIT data as it received from in the additional transports.

38. The method recited in claim 36 further comprising the step of providing more than two days of the sparse EIT data.

39. The method recited in claim 36, further comprising the step of displaying the electronic program guide information responsive to the user request on a television.

40. The method recited in claim 36, further comprising the step of tuning away from the actual transport to one of the additional transports to obtain full EIT data corresponding to a future time frame that is not contained in the actual transport.

41. A set top box for use in a system to provide electronic program guide information to a user, comprising:

means for receiving electronic program guide information from an actual transport comprising a first predetermined number of days of full EIT data and one or more additional transports, each additional transport comprising a second predetermined number of hours of full EIT data and a third predetermined number of days of sparse EIT data, wherein the sparse EIT data comprises some, but not all, of full EIT data corresponding to a future time frame; and means for providing the electronic program guide information to a user in response to a user request for the electronic program guide information without combining the sparse EIT data to create full EIT data.

42. The set top box recited in claim 41, further comprising means for storing the full EIT data as it is received from the actual and additional transports and the sparse EIT data as it is received from the additional transports.

43. The set top box recited in claim 41, further comprising means for storing more than two days of the sparse EIT data.

44. The set top box recited in claim 41, further comprising means for displaying the electronic program guide information responsive to the user request on a television.

45. The set top box recited in claim 41, further comprising means for tuning away from the actual transport to one of the additional transports to obtain full EIT data corresponding to a future time frame that is not contained in the actual transport.

46. A system for providing electronic program guide information in response to a user request, comprising:

an actual transport comprising a first predetermined number of days of full EIT data;

one or more additional transports, each additional transport comprising a second predetermined number of hours of full EIT data and a third predetermined number of days of sparse EIT data;

a set top box tuned to the actual transport for receiving the EIT data contained in the actual and additional transports, the set top box comprising a memory for storing the first predetermined number of days of full EIT data as it is received from the actual transport, the second predetermined number of hours of full EIT data as it is received from the additional transports and the third predetermined number of days of sparse EIT data as is received from the additional transports without combining the sparse EIT data to create full EIT data.

47. The system recited in claim 46, wherein the sparse EIT data comprises some, but not all, of full EIT data corresponding to a future time frame.

48. The system recited in claim 46, wherein the predetermined number of days of sparse EIT data is greater than two.

49. The system recited in claim 46, further comprising a television on which the electronic program guide information is displayed in response to the user request.

50. The system recited in claim 46, further comprising a content provider to provide content for the actual transport and additional transports.

51. The system recited in claim 46, wherein the set top box tunes away from the actual transport to one of the additional transports to obtain full EIT data corresponding to a future time frame that is not contained in the actual transport.

52. A method for providing video services, comprising the steps of:

receiving electronic program guide information from an actual transport comprising a first predetermined number of days of full EIT data and one or more additional transports, each additional transport comprising a second predetermined number of hours of full EIT data and a third predetermined number of days of sparse EIT data;

storing the first predetermined number of days of full EIT data as it is received from the actual transport;

storing the second predetermined number of hours of full EIT data as it is received in the additional transports;

storing the third predetermined number of days of sparse EIT data as it is received in the additional transports; and providing the electronic program guide information to a user in response to a user request for the electronic program guide information without combining the sparse EIT data to create full EIT data.

53. The method recited in claim 52, further comprising the step of providing more than two days of the sparse EIT data.

54. The method recited in claim 52, further comprising the step of displaying the electronic program guide information in response to the user request on a television.

55. The method recited in claim 52, further comprising the step of tuning away from the actual transport to one of the additional transports to obtain full EIT data corresponding to a future time frame that is not contained in the actual transport.

56. The method recited in claim 52, wherein the sparse EIT data comprises some, but not all, of full EIT data corresponding to a future time frame.

57. A set top box for providing video services, comprising:

means for receiving electronic program guide information from an actual transport comprising a first predetermined number of days of full EIT data and one or more additional transports, each additional transport comprising a second predetermined number of hours of full EIT data and a third predetermined number of days of sparse EIT data;

means for storing the first predetermined number of days of full EIT data transmitted in the actual transport;

means for storing the second predetermined number of hours of full EIT data transmitted in the additional transports;

means for storing the third predetermined number of days of sparse EIT data transmitted in the additional transports; and means for providing the electronic program guide information to a user in response to a user request for the electronic program guide information without combining the sparse EIT data to create full EIT data.

58. The set top box recited in claim 57 further comprising means for providing more than two days of the sparse EIT data.

59. The set top box recited in claim 57, further comprising means for displaying the electronic program guide information in response to the user request on a television.

60. The set top box recited in claim 57, further comprising the means for tuning away from the actual transport to one of the additional transports to obtain full EIT data corresponding to a future time frame that is not contained in the actual transport.

61. The set top box recited in claim 57, wherein the sparse EIT data comprises some, but not all, of the full EIT data.

62. A system for providing electronic program guide information in response to a user request, comprising:

a first predetermined number of days of full EIT data transmitted on an actual transport at a predetermined data rate;

a second predetermined number of hours of full EIT data transmitted on one or more additional transports at the predetermined data rate;

a third predetermined number of days of sparse EIT data transmitted on the one or more additional transports at the predetermined data rate; and a set top box tuned to the actual transport for receiving the electronic program guide information transmitted in the actual and additional transports.

63. The system recited in claim 62, wherein the set top box further comprises a memory for storing the first predetermined number of days of full EIT data as it is received from the actual transport, the second predetermined number of hours of full EIT data as it is received from the additional transports and the third predetermined number of days of sparse EIT data as it is received from the additional transports.

64. The system recited in claim 62, wherein the third predetermined number of days of sparse EIT data is greater than 2.

65. The system recited in claim 62, wherein the sparse EIT data is comprises some, but not all, of full EIT data corresponding to a future time frame.

66. The system recited in claim 62, wherein the electronic program guide data is displayed on a television.

67. The system recited in claim 62, wherein the set top box tunes away from the actual transport to one of the additional transports to obtain full EIT data corresponding to a future time frame that is not included in the actual transport.

68. A method for providing electronic program guide information in response to a user request, comprising the steps of:

transmitting a first predetermined number of days of full EIT data on an actual transport at a predetermined data rate;

transmitting a second predetermined number of hours of full EIT data on one or more additional transports at the predetermined data rate;

transmitting a third predetermined number of days of sparse EIT data on one or more additional transports at the predetermined data rate; and receiving the electronic program guide information transmitted in the actual and additional transports.

69. The method recited in claim 68, further comprising the step of storing the first predetermined number of days of full EIT data as it is received from the actual transport, the second predetermined number of hours of full EIT data as it is received from the additional transports and the third predetermined number of days of sparse EIT data as it is received from the additional transports.

70. The system recited in claim 69, wherein the third predetermined number of days of sparse EIT data is greater than two.

71. The system recited in claim 69, wherein the sparse EIT data comprises some, but not all, of full EIT data corresponding to a future time frame.

72. The system recited in claim 69, wherein the electronic program guide data is displayed on a television.

73. The system recited in claim 69, wherein the set top box tunes away from the actual transport to one of the additional transports to obtain full EIT data corresponding to a future time frame to respond to a request for full EIT data corresponding to the future time frame not included in the actual transport.

74. A set top box, comprising:

means for receiving full EIT data streamed at a predetermined data rate;

means for receiving sparse EIT data streamed at the predetermined data rate, the sparse EIT data comprising some, but not all, of the full EIT data;

means for accepting a request from a user to display electronic program guide information; and means for responding to the request using the received full and sparse EIT data.

75. The set top box recited in claim 74, wherein the sparse EIT data comprises some but not all of full EIT data corresponding to a future time frame.

76. The set top box recited in claim 74, further comprising:

means for receiving a first predetermined number of days of the full EIT data from an actual transport;

means for receiving a second predetermined number of hours of the full EIT data from one or more additional transports; and means for receiving a third predetermined number of days of the sparse EIT data from the one or more additional transports.

77. The set top box recited in claim 74, further comprising:

means for storing the full EIT data in a memory as it is received; and means for storing the sparse EIT data in the memory as it is received.

\* \* \* \* \*